(12) United States Patent
Watson et al.

(10) Patent No.: US 12,159,358 B2
(45) Date of Patent: Dec. 3, 2024

(54) HIGH-SPEED REAL-TIME SCENE RECONSTRUCTION FROM INPUT IMAGE DATA

(71) Applicant: Niantic, Inc., San Francisco, CA (US)

(72) Inventors: James Watson, London (GB); Sara Alexandra Gomes Vicente, London (GB); Oisin MacAodha, Edinburgh (GB); Clément Godard, San Francisco, CA (US); Gabriel J. Brostow, London (GB); Michael David Firman, London (GB)

(73) Assignee: Niantic, Inc., San Francisco, CA (US)

( * ) Notice: Subject to any disclaimer, the term of this patent is extended or adjusted under 35 U.S.C. 154(b) by 190 days.

(21) Appl. No.: 18/080,910

(22) Filed: Dec. 14, 2022

(65) Prior Publication Data

US 2023/0196690 A1 Jun. 22, 2023

Related U.S. Application Data

(60) Provisional application No. 63/290,440, filed on Dec. 16, 2021.

(51) Int. Cl.
*G06T 19/00* (2011.01)
*G05D 1/00* (2024.01)
(Continued)

(52) U.S. Cl.
CPC ......... *G06T 19/006* (2013.01); *G05D 1/0088* (2013.01); *G06V 10/771* (2022.01); *G06V 10/82* (2022.01)

(58) Field of Classification Search
CPC .... G06T 19/006; G06V 10/771; G06V 10/82; G05D 1/0088
See application file for complete search history.

(56) References Cited

U.S. PATENT DOCUMENTS

2010/0271365 A1* 10/2010 Smith .............. G06T 13/20
382/118
2013/0060540 A1* 3/2013 Frahm ............. G06T 15/06
703/2
(Continued)

FOREIGN PATENT DOCUMENTS

WO WO-2021056278 A1 * 4/2021

OTHER PUBLICATIONS

Zienkiewicz, Jacek, Andrew Davison, and Stefan Leutenegger. "Real-time height map fusion using differentiable rendering." 2016 IEEE/RSJ International Conference on Intelligent Robots and Systems (IROS). IEEE, 2016. (Year: 2016).*
(Continued)

*Primary Examiner* — Xin Sheng
(74) *Attorney, Agent, or Firm* — Fenwick & West LLP

(57) ABSTRACT

A scene reconstruction model is disclosed that outputs a heightfield for a series of input images. The model, for each input image, predicts a depth map and extracts a feature map. The model builds a 3D model utilizing the predicted depth maps and camera poses for the images. The model raycasts the 3D model to determine a raw heightfield for the scene. The model utilizes the raw heightfield to sample features from the feature maps corresponding to positions on the heightfield. The model aggregates the sampled features into an aggregate feature map. The model regresses a refined heightfield based on the aggregate feature map. The model determines the final heightfield based on a combination of the raw heightfield and the refined heightfield. With the final heightfield, a client device may generate virtual content augmented on real-world images captured by the client device.

31 Claims, 7 Drawing Sheets

(51) Int. Cl.
*G06V 10/771* (2022.01)
*G06V 10/82* (2022.01)

(56) References Cited

U.S. PATENT DOCUMENTS

2014/0184591 A1\* 7/2014 Boschker ............. G01C 21/367
                                                            345/419
2021/0090322 A1\* 3/2021 Hunt ....................... G06F 3/012

OTHER PUBLICATIONS

Gallup, D. et al., "A Heightmap Model for Efficient 3D Reconstruction from Street-Level Video," Int. Conf. on 3D Data Processing, Visualization and Transmission. vol. 6. Apr. 2011, pp. 1-9.
PCT International Search Report and Written Opinion, PCT Application No. PCT/IB2022/062234, Mar. 16, 2023, 10 pages.
Ruiters, R. et al., "Heightfield and spatially varying BRDF Reconstruction for Materials with Interreflections," Computer Graphics Forum. Oxford, UK: Blackwell Publishing Ltd, vol. 28, No. 2, Mar. 27, 2009, pp. 513-522.
Zienkiewicz, J. et al., "Real-time height map fusion using differentiable rendering," IEEE/ RSJ International Conference on Intelligent Robots and Systems (IROS), Oct. 9, 2016, pp. 4280-4287.

\* cited by examiner

HIGH-SPEED REAL-TIME SCENE RECONSTRUCTION FROM INPUT IMAGE DATA

CROSS REFERENCE TO RELATED APPLICATIONS

The present application claims the benefit of and priority to U.S. Provisional Application No. 63/290,440 filed on Dec. 16, 2021, which is incorporated by reference in its entirety.

BACKGROUND

1. Technical Field

The subject matter described relates generally to three-dimensional (3D) scene reconstruction from input image data.

2. Problem

Three-dimensional scene reconstruction from input image data is a cornerstone task for computer vision. It can be particularly useful for augmented reality applications and/or agent navigation. Recent methods can achieve high quality reconstructions, but at the cost of increased runtime and memory requirements. This can cause latency in placement and/or movement of the virtual character undercutting the perception of augmented reality. Likewise, with agent navigation, delayed scene reconstruction can create a delay in determining navigational guidance.

SUMMARY

The present disclosure describes an approach to scene reconstruction model that provides quality scene reconstruction at high speed in real time. The scene reconstruction model inputs image data that may comprise real-time video captured by a user device. The scene reconstruction model builds a 3D representation of the environment in high-speed real-time. The user device may utilize the 3D representation for virtual character placement, agent navigation, other computer vision tasks, etc. The scene reconstruction model is capable of reconstructing occluded areas.

In one or more embodiments, the scene reconstruction model generally hybridizes generation of a raw heightfield from predicted depth maps and regression of a refined heightfield from feature maps of the images. For each image, the scene reconstruction model predicts a depth map and a feature map based on the input images and camera poses. The depth map includes a depth value for each pixel of the input image. The feature map includes features of the input image. Features may include abstract features (i.e., convolutional features), objects of interest, corners, edges, outlines of objects, horizon, semantic segmentation, other characteristics of the input image, or some combination thereof. To build the raw heightfield, the scene reconstruction model builds a 3D model of the environment then ray casts the 3D voxel array to generate the raw heightfield. To regress the refined heightfield, the scene reconstruction model projects the raw heightfield to the camera pose of each image and samples features from the feature map based on the visible surfaces in the projected raw heightfield. The scene reconstruction model aggregates the features sampled from the images and inputs the aggregated feature map to regress the refined heightfield. Generally speaking, the raw heightfield has sharp definition but may be incomplete in certain portions of the environment that have low signal from the images. However, the refined heightfield regresses and fills in the low-signal portions but may have less definition. As such, the scene reconstruction model creates the final heightfield by blending the raw heightfield and the refined heightfield, thereby leveraging the advantages of each.

The figures and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures.

DETAILED DESCRIPTION

Exemplary Location-Based Parallel Reality Gaming System

Various embodiments are described in the context of a parallel reality game that includes augmented reality content in a virtual world geography that parallels at least a portion of the real-world geography such that player movement and actions in the real-world affect actions in the virtual world and vice versa. Those of ordinary skill in the art, using the disclosures provided herein, will understand that the subject matter described is applicable in other situations where a scene reconstruction from image data is beneficial. In addition, the inherent flexibility of computer-based systems allows for a great variety of possible configurations, combinations, and divisions of tasks and functionality between and among the components of the system. For instance, the systems and methods according to aspects of the present disclosure can be implemented using a single computing device or across multiple computing devices (e.g., connected in a computer network).

Figure 1:
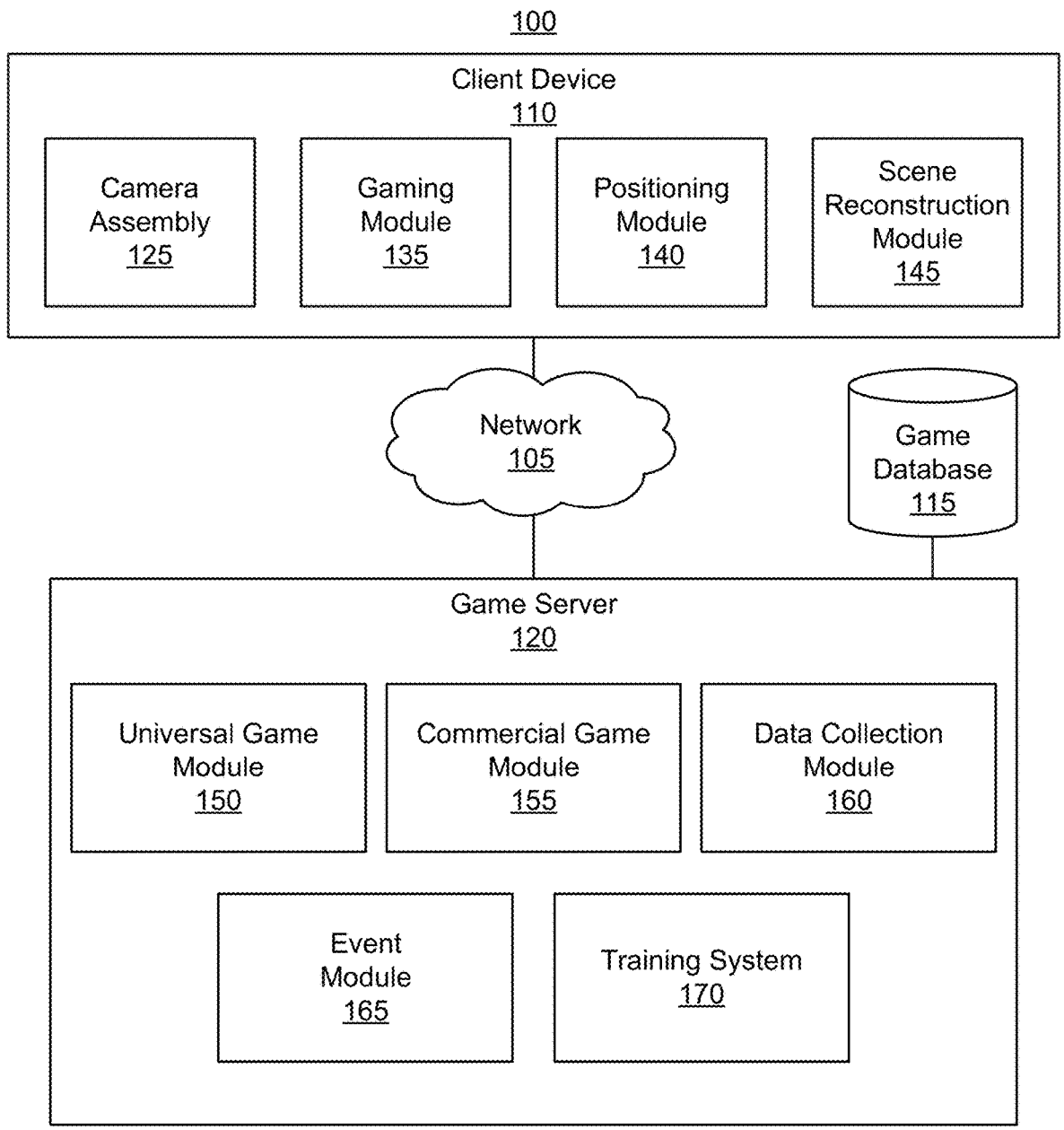
FIG. 1 illustrates a networked computing environment, according to one or more embodiments.

FIG. 1 illustrates a networked computing environment 100, according to one or more embodiments. The networked computing environment 100 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 120 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 120.

Figure 2:
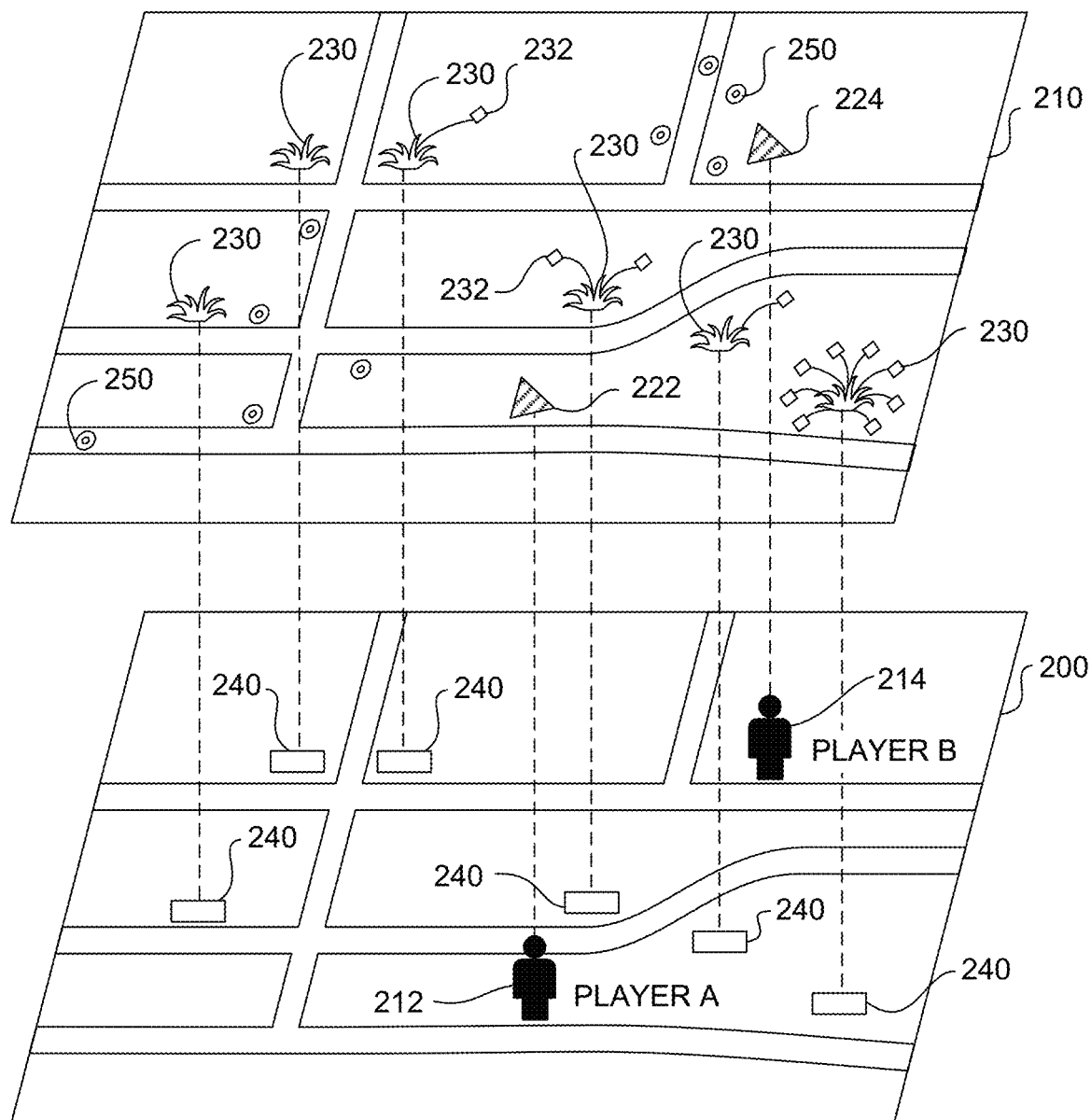
FIG. 2 depicts a representation of a virtual world having a geography that parallels the real world, according to one or more embodiments.

Reference is now made to FIG. 2 which depicts a conceptual diagram of a virtual world 210 that parallels the real world 200 that can act as the game board for players of a parallel reality game, according to one embodiment. As illustrated, the virtual world 210 can include a geography that parallels the geography of the real world 200. In particular, a range of coordinates defining a geographic area or space in the real world 200 is mapped to a corresponding range of coordinates defining a virtual space in the virtual world 210. The range of coordinates in the real world 200 can be associated with a town, neighborhood, city, campus, locale, a country, continent, the entire globe, or other geographic area. Each geographic coordinate in the range of geographic coordinates is mapped to a corresponding coordinate in a virtual space in the virtual world.

A player's position in the virtual world 210 corresponds to the player's position in the real world 200. For instance, the player A located at position 212 in the real world 200 has a corresponding position 222 in the virtual world 210. Similarly, the player B located at position 214 in the real world has a corresponding position 224 in the virtual world. As the players move about in a range of geographic coordinates in the real world, the players also move about in the range of coordinates defining the virtual space in the virtual world 210. In particular, a positioning system (e.g., a GPS system) associated with a mobile computing device carried by the player can be used to track a player's position as the player navigates the range of geographic coordinates in the real world. Data associated with the player's position in the real world 200 is used to update the player's position in the corresponding range of coordinates defining the virtual space in the virtual world 210. In this manner, players can navigate along a continuous track in the range of coordinates defining the virtual space in the virtual world 210 by simply traveling among the corresponding range of geographic coordinates in the real world 200 without having to check in or periodically update location information at specific discrete locations in the real world 200.

The location-based game can include a plurality of game objectives requiring players to travel to and/or interact with various virtual elements and/or virtual objects scattered at various virtual locations in the virtual world. A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements and/or objects at the specific location to achieve or perform one or more game objectives.

For example, a game objective has players interacting with virtual elements 230 located at various virtual locations in the virtual world 210. These virtual elements 230 can be linked to landmarks, geographic locations, or objects 240 in the real world 200. The real-world landmarks or objects 240 can be works of art, monuments, buildings, businesses, libraries, museums, or other suitable real-world landmarks or objects. Interactions include capturing, claiming ownership of, using some virtual item, spending some virtual currency, etc. To capture these virtual elements 230, a player must travel to the landmark or geographic location 240 linked to the virtual elements 230 in the real world and must perform any necessary interactions with the virtual elements 230 in the virtual world 210. For example, player A of FIG. 2 may have to travel to a landmark 240 in the real world 200 in order to interact with or capture a virtual element 230 linked with that particular landmark 240. The interaction with the virtual element 230 can require action in the real world, such as taking a photograph and/or verifying, obtaining, or capturing other information about the landmark or object 240 associated with the virtual element 230.

Game objectives may require that players use one or more virtual items that are collected by the players in the location-based game. For instance, the players may travel the virtual world 210 seeking virtual items (e.g. weapons, creatures, power ups, or other items) that can be useful for completing game objectives. These virtual items can be found or collected by traveling to different locations in the real world 200 or by completing various actions in either the virtual world 210 or the real world 200. In the example shown in FIG. 2, a player uses virtual items 232 to capture one or more virtual elements 230. In particular, a player can deploy virtual items 232 at locations in the virtual world 210 proximate or within the virtual elements 230. Deploying one or more virtual items 232 in this manner can result in the capture of the virtual element 230 for the particular player or for the team/faction of the particular player.

In one particular implementation, a player may have to gather virtual energy as part of the parallel reality game. As depicted in FIG. 2, virtual energy 250 can be scattered at different locations in the virtual world 210. A player can collect the virtual energy 250 by traveling to the corresponding location of the virtual energy 250 in the actual world 200. The virtual energy 250 can be used to power virtual items and/or to perform various game objectives in the game. A player that loses all virtual energy 250 can be disconnected from the game.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real world locations for cooperative or interactive events in the parallel reality game. In these cases, the game server seeks to ensure players are indeed physically present and not spoofing.

The parallel reality game can have various features to enhance and encourage game play within the parallel reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. In some embodiments, players can communicate with one another through one or more communication interfaces provided in the game. Players can also obtain enhanced "powers" or virtual items that can be used to complete game objectives within the game. In some embodiments, a player can turn on the camera of the mobile device to provide an augmented reality experience where real-time image data is displayed augmented with generated virtual content. The generation of the virtual content may rely in part on a 3D representation of the scene (e.g., as determined by a scene reconstruction model). Those of ordinary skill in the art, using the disclosures provided herein, should understand that various other game features can be included with the parallel reality game without deviating from the scope of the present disclosure.

In one or more embodiments, the parallel reality game may incorporate an augmented reality experience. Augmented reality generally includes generating and displaying virtual content in a real-world environment. In one or more examples, the client device 110 may be an eyewear device or another type of headset with one or more lenses that at least partially transmit light from the environment with capabilities of displaying virtual content in conjunction with the transmitted light from the real-world. In other examples, the client device 110 comprises an electronic display that presents a live feed of the camera assembly capturing a real-world environment. The client device 110 may generate virtual content that is overlaid onto the live feed. In either case, the effect is similar. There is virtual content that is presented in conjunction with real-world content. As an example, a virtual character may be generated and displayed in conjunction with the live feed from the camera assembly. The virtual character may be so generated to realistically interact with the environment.

Referring back FIG. 1, the networked computing environment 100 uses a client-server architecture, where a game server 120 communicates with a client device 110 over a network 105 to provide a parallel reality game to players at the client device 110. The networked computing environment 100 also may include other external systems such as sponsor/advertiser systems or business systems. Although only one client device 110 is illustrated in FIG. 1, any number of clients 110 or other external systems may be connected to the game server 120 over the network 105. Furthermore, the networked computing environment 100 may contain different or additional elements and functionality may be distributed between the client device 110 and the server 120 in a different manner than described below.

A client device 110 can be any portable computing device that can be used by a player to interface with the game server 120. For instance, a client device 110 can be a wireless device, a personal digital assistant (PDA), portable gaming device, cellular phone, smart phone, tablet, navigation system, handheld GPS system, wearable computing device, a display having one or more processors, or other such device. In another instance, the client device 110 includes a conventional computer system, such as a desktop or a laptop computer. Still yet, the client device 110 may be a vehicle with a computing device. In short, a client device 110 can be any computer device or system that can enable a player to interact with the game server 120. As a computing device, the client device 110 can include one or more processors and one or more computer-readable storage media. The computer-readable storage media can store instructions which cause the processor to perform operations. The client device 110 is preferably a portable computing device that can be easily carried or otherwise transported with a player, such as a smartphone or tablet.

The client device 110 communicates with the game server 120 providing the game server 120 with sensory data of a physical environment. The client device 110 includes a camera assembly 125 that captures image data in two dimensions of a scene in the physical environment where the client device 110 is. In the embodiment shown in FIG. 1, each client device 110 includes software components such as a gaming module 135 and a positioning module 140. The client device 110 also includes a scene reconstruction module 145. The client device 110 may include various other input/output devices for receiving information from and/or providing information to a player. Example input/output devices include a display screen, a touch screen, a touch pad, data entry keys, speakers, and a microphone suitable for voice recognition. The client device 110 may also include other various sensors for recording data from the client device 110 including but not limited to movement sensors, accelerometers, gyroscopes, other inertial measurement units (IMUs), barometers, positioning systems, thermometers, light sensors, etc. The client device 110 can further include a network interface for providing communications over the network 105. A network interface can include any suitable components for interfacing with one more networks, including for example, transmitters, receivers, ports, controllers, antennas, or other suitable components.

The camera assembly 125 captures image data of a scene of the environment where the client device 110 is in. The camera assembly 125 may utilize a variety of varying photo sensors with varying color capture ranges at varying capture rates. The camera assembly 125 may contain a wide-angle lens or a telephoto lens. The camera assembly 125 may be configured to capture single images or video as the image data. Additionally, the orientation of the camera assembly 125 could be parallel to the ground with the camera assembly 125 aimed at the horizon. The camera assembly 125 captures image data and shares the image data with the computing device on the client device 110. The image data can be appended with metadata describing other details of the image data including sensory data (e.g. temperature, brightness of environment) or capture data (e.g. exposure, warmth, shutter speed, focal length, capture time, etc.). The camera assembly 125 can include one or more cameras which can capture image data. In one instance, the camera assembly 125 comprises one camera and is configured to capture monocular image data. In another instance, the camera assembly 125 comprises two cameras and is configured to capture stereoscopic image data. In various other implementations, the camera assembly 125 comprises a plurality of cameras each configured to capture image data.

The gaming module 135 provides a player with an interface to participate in the parallel reality game. The game server 120 transmits game data over the network 105 to the client device 110 for use by the gaming module 135 at the client device 110 to provide local versions of the game to players at locations remote from the game server 120. The game server 120 can include a network interface for providing communications over the network 105. A network interface can include any suitable components for interfacing with one more networks, including for example, transmitters, receivers, ports, controllers, antennas, or other suitable components.

The gaming module 135 executed by the client device 110 provides an interface between a player and the parallel reality game. The gaming module 135 can present a user interface on a display device associated with the client device 110 that displays a virtual world (e.g. renders imagery of the virtual world) associated with the game and allows a user to interact in the virtual world to perform various game objectives. In some other embodiments, the gaming module 135 presents image data from the real world (e.g., captured by the camera assembly 125) augmented with virtual elements from the parallel reality game. In these embodiments, the gaming module 135 may generate virtual content and/or adjust virtual content according to other information received from other components of the client device 110. For example, the gaming module 135 may adjust a virtual object to be displayed on the user interface according to 3D representation created by the scene reconstruction module 145. Based on the 3D representation, the gaming module 135 can have a virtual object interact with the various surfaces, e.g., a virtual character is displayed hopping onto a table.

The gaming module 135 can also control various other outputs to allow a player to interact with the game without requiring the player to view a display screen. For instance, the gaming module 135 can control various audio, vibratory, or other notifications that allow the player to play the game without looking at the display screen. The gaming module 135 can access game data received from the game server 120 to provide an accurate representation of the game to the user. The gaming module 135 can receive and process player input and provide updates to the game server 120 over the network 105. The gaming module 135 may also generate and/or adjust game content to be displayed by the client device 110. For example, the gaming module 135 may generate a virtual element based on depth information.

The positioning module 140 can be any device or circuitry for monitoring the position of the client device 110. For example, the positioning module 140 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, and/or other suitable techniques for determining position. The positioning module 140 may further include various other sensors that may aid in accurately positioning the client device 110 location.

As the player moves around with the client device 110 in the real world, the positioning module 140 tracks the position of the player and provides the player position information to the gaming module 135. The gaming module 135 updates the player position in the virtual world associated with the game based on the actual position of the player in the real world. Thus, a player can interact with the virtual world simply by carrying or transporting the client device 110 in the real world. In particular, the location of the player in the virtual world can correspond to the location of the player in the real world. The gaming module 135 can provide player position information to the game server 120 over the network 105. In response, the game server 120 may enact various techniques to verify the client device 110 location to prevent cheaters from spoofing the client device 110 location. It should be understood that location information associated with a player is utilized only if permission is granted after the player has been notified that location information of the player is to be accessed and how the location information is to be utilized in the context of the game (e.g. to update player position in the virtual world). In addition, any location information associated with players will be stored and maintained in a manner to protect player privacy.

The scene reconstruction module 145 uses a trained scene reconstruction model to create a 3D representation of a scene from image data captured by the camera assembly 125. The scene reconstruction model is trained by the game server 120 or another suitable computing device, and provided to the client device 110. Generally, the trained scene reconstruction model inputs the images from image data captured by the camera assembly 125. The scene reconstruction module 145 uses the trained scene reconstruction model to build and maintain a 3D representation of the scene as image data is captured by the camera assembly 125. In one or more embodiments, a 3D representation comprises a heightfield. A heightfield is a two-dimensional (2D) representation of a 3D representation of a scene, wherein each pixel of the heightfield corresponds to a height value of a real-world object at that pixel. The heightfield practically serves as a topography of the environment.

In one or more embodiments, the trained scene reconstruction model comprises four stages in generating the 3D representation of the environment or the scene. In the first stage, for each image, the trained scene reconstruction model predicts a depth map and a feature map. The depth map includes a depth value for each pixel of the input image. The feature map includes features of the input image. Features may include abstract features (i.e., convolutional features), objects of interest, corners, edges, outlines of objects, horizon, semantic segmentation, other characteristics of the input image, or some combination thereof. The feature map may be dimensionally smaller than the input image. In the second stage, the trained scene reconstruction model generates a 3D voxel array. In one or more embodiments, the voxel array is represented as a Truncated Signed Distance Field (TSDF) volume that is expanded and/or updated as additional images are captured by the camera assembly 125. The 3D voxel array can be used to generate a raw heightfield. In the third stage, the trained scene reconstruction model generates a top-down feature map aggregating the feature maps of the input images. In the fourth stage, the scene reconstruction model creates the final heightfield based on the raw heightfield and the aggregated features. To do so, the scene reconstruction model may regress a refined heightfield based on the top-down feature map. In one or more embodiments, the refined heightfield is regressed via a deep learning neural network. The raw heightfield may inform the top-down aggregation of features, and/or the regression of the refined heightfield. The trained scene reconstruction model may generate a final heightfield based on a combination of the raw heightfield and the refined heightfield. In one or more embodiments, the final heightfield blends the raw heightfield and the refined heightfield.

The game server 120 can be any computing device and can include one or more processors and one or more computer-readable storage media. The computer-readable storage media can store instructions which cause the processor to perform operations. The game server 120 can include or can be in communication with a game database 115. The game database 115 stores game data used in the parallel reality game to be served or provided to the client(s) 120 over the network 105.

The game data stored in the game database 115 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real-world objects, landmarks, positions linked to virtual-world elements (e.g. location of real-world objects/landmarks, description of real-world objects/landmarks, relevance of virtual elements linked to real-world objects, etc.); (6) Game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the parallel reality game. The game data stored in the game database 115 can be populated either offline or in real time by system administrators and/or by data received from users/players of the system 100, such as from a client device 110 over the network 105.

The game server 120 can be configured to receive requests for game data from a client device 110 (for instance via remote procedure calls (RPCs)) and to respond to those requests via the network 105. For instance, the game server 120 can encode game data in one or more data files and provide the data files to the client device 110. In addition, the game server 120 can be configured to receive game data (e.g. player positions, player actions, player input, etc.) from a client device 110 via the network 105. For instance, the client device 110 can be configured to periodically send player input and other updates to the game server 120, which the game server 120 uses to update game data in the game database 115 to reflect any and all changed conditions for the game.

In the embodiment shown, the server 120 includes a universal game module 150, a commercial game module 155, a data collection module 160, an event module 165, and a training system 170. As mentioned above, the game server 120 interacts with a game database 115 that may be part of the game server 120 or accessed remotely (e.g., the game database 115 may be a distributed database accessed via the network 105). In other embodiments, the game server 120 contains different and/or additional elements. In addition, the functions may be distributed among the elements in a different manner than described. For instance, the game database 115 can be integrated into the game server 120.

The universal game module 150 hosts the parallel reality game for all players and acts as the authoritative source for the current status of the parallel reality game for all players. As the host, the universal game module 150 generates game content for presentation to players, e.g., via their respective client devices 110. The universal game module 150 may access the game database 115 to retrieve and/or store game data when hosting the parallel reality game. The universal game module 150 also receives game data from client device 110 (e.g. depth information, player input, player position, player actions, landmark information, etc.) and incorporates the game data received into the overall parallel reality game for all players of the parallel reality game. The universal game module 150 can also manage the delivery of game data to the client device 110 over the network 105. The universal game module 150 may also govern security aspects of client device 110 including but not limited to securing connections between the client device 110 and the game server 120, establishing connections between various client device 110, and verifying the location of the various client device 110.

The commercial game module 155, in embodiments where one is included, can be separate from or a part of the universal game module 150. The commercial game module 155 can manage the inclusion of various game features within the parallel reality game that are linked with a commercial activity in the real world. For instance, the commercial game module 155 can receive requests from external systems such as sponsors/advertisers, businesses, or other entities over the network 105 (via a network interface) to include game features linked with commercial activity in the parallel reality game. The commercial game module 155 can then arrange for the inclusion of these game features in the parallel reality game.

The game server 120 can further include a data collection module 160. The data collection module 160, in embodiments where one is included, can be separate from or a part of the universal game module 150. The data collection module 160 can manage the inclusion of various game features within the parallel reality game that are linked with a data collection activity in the real world. For instance, the data collection module 160 can modify game data stored in the game database 115 to include game features linked with data collection activity in the parallel reality game. The data collection module 160 can also analyze and data collected by players pursuant to the data collection activity and provide the data for access by various platforms.

The event module 165 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

The training system 170 trains a scene reconstruction model, e.g., that may be provided to the client device 110. The training system 170 receives image data for use in training the scene reconstruction model. Generally, the training system 170 inputs image data into the scene reconstruction model to predict a depth map and a feature map for each image, to determine a 3D voxel array (e.g., a TSDF volume), generate a raw heightfield from the 3D voxel array, generate a top-down feature map based on the feature maps of the images, regress a refined heightfield based on the top-down feature map, and blend the raw heightfield and the refined heightfield into a final heightfield.

To train the scene reconstruction model, the training system 170 calculates an overall loss based on the final heightfield compared against a ground truth heightfield. At one or more of the steps, the training system 170 may adjust one or more parameters of the scene reconstruction model to minimize the overall loss.

In some embodiments, the training system 170 may train various steps asynchronously, i.e., by utilizing a separate ground truth and a separate loss for training of the subset of steps. For example, the training system 170 may asynchronously train the depth network used to predict the depth map and/or may asynchronously train the feature network used to generate the feature map. The general process above describes a supervised training algorithm. In one or more embodiments, unsupervised training trains without ground truth knowledge of the heightfield.

Once the scene reconstruction model is trained, the scene reconstruction model receives image data and outputs a 3D representation, which may be the final heightfield of the scene. The scene reconstruction model may also receive additional image data to iteratively expand and/or update the 3D representation. For example, the scene reconstruction model may input a first of images having a perspective on a first region of the environment to output a 3D representation of the first region. As another set of images having a perspective on a second region of the environment is captured by the camera assembly, then the scene reconstruction model may expand the 3D representation to incorporate the second region in addition to the first region. In some examples, the first region and the second region may be at least partially overlapping. The overlapping portion of the second set of images may refine and/or update the 3D representation of the first region.

The network 105 can be any type of communications network, such as a local area network (e.g. intranet), wide area network (e.g. Internet), or some combination thereof. The network can also include a direct connection between a client device 110 and the game server 120. In general, communication between the game server 120 and a client device 110 can be carried via a network interface using any type of wired and/or wireless connection, using a variety of communication protocols (e.g. TCP/IP, HTTP, SMTP, FTP), encodings or formats (e.g. HTML, XML, JSON), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

In addition, in situations in which the systems and methods discussed herein access and analyze personal information about users, or make use of personal information, such as location information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Exemplary Game Interface

Figure 3:
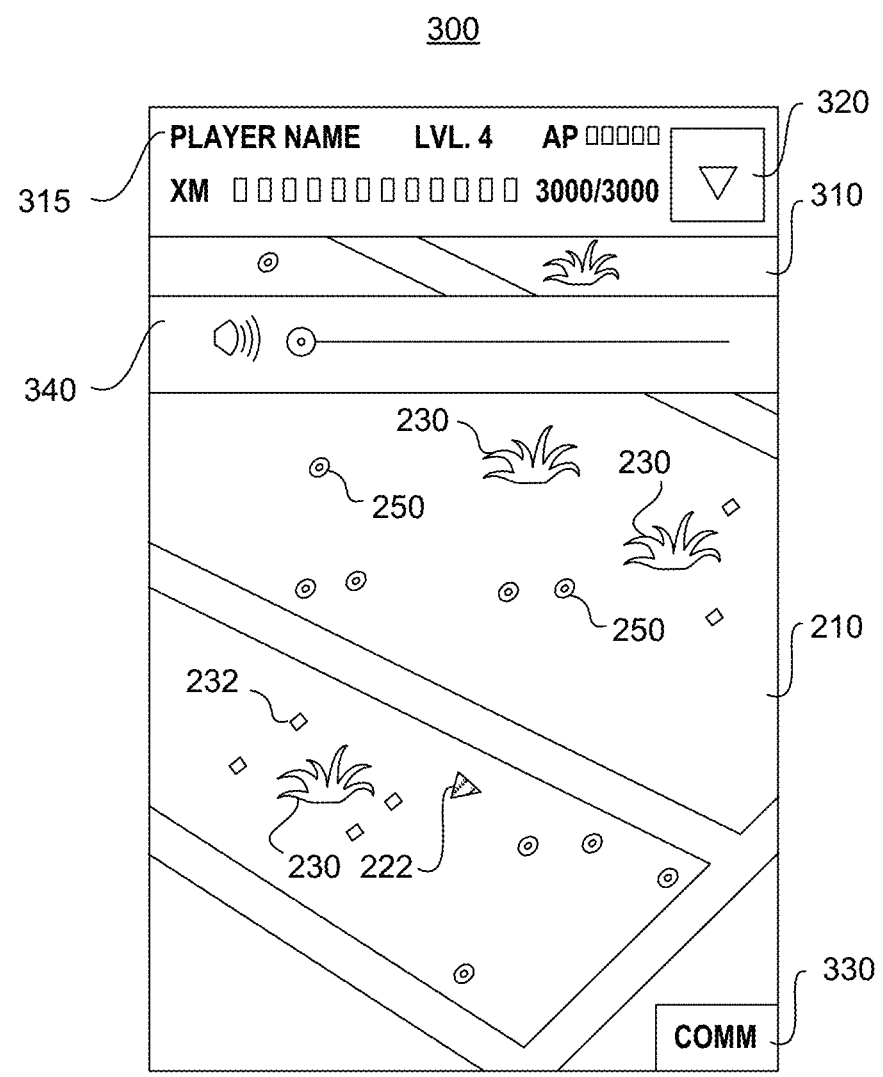
FIG. 3 depicts an exemplary game interface of a parallel reality game, according to one or more embodiments.

FIG. 3 depicts one embodiment of a game interface 300 that can be presented on a display of a client 120 as part of the interface between a player and the virtual world 210. The game interface 300 includes a display window 310 that can be used to display the virtual world 210 and various other aspects of the game, such as player position 222 and the locations of virtual elements 230, virtual items 232, and virtual energy 250 in the virtual world 210. The user interface 300 can also display other information, such as game data information, game communications, player information, client location verification instructions and other information associated with the game. For example, the user interface can display player information 315, such as player name, experience level and other information. The user interface 300 can include a menu 320 for accessing various game settings and other information associated with the game. The user interface 300 can also include a communications interface 330 that enables communications between the game system and the player and between one or more players of the parallel reality game.

According to aspects of the present disclosure, a player can interact with the parallel reality game by simply carrying a client device 120 around in the real world. For instance, a player can play the game by simply accessing an application associated with the parallel reality game on a smartphone and moving about in the real world with the smartphone. In this regard, it is not necessary for the player to continuously view a visual representation of the virtual world on a display screen in order to play the location-based game. As a result, the user interface 300 can include a plurality of non-visual elements that allow a user to interact with the game. For instance, the game interface can provide audible notifications to the player when the player is approaching a virtual element or object in the game or when an important event happens in the parallel reality game. A player can control these audible notifications with audio control 340. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

In some embodiments, the game interface 300 may be an augmented reality experience. The game interface 300 may display the real-world environment as captured by the camera assembly augmented with virtual content generated by the gaming module. In the example shown in FIG. 3, the ground environment is captured by the camera assembly. Overlaid on the real-world image are virtual objects (e.g., the virtual elements 230, the virtual items 232, the virtual energy 250, virtual characters, etc.). The virtual objects may be generated and positioned based on the 3D representation generated by the scene reconstruction model. For example, a virtual object may be dropped from the sky and bounce on surfaces in the real-world object based on the 3D representation generated by the scene reconstruction model.

Figure 4:
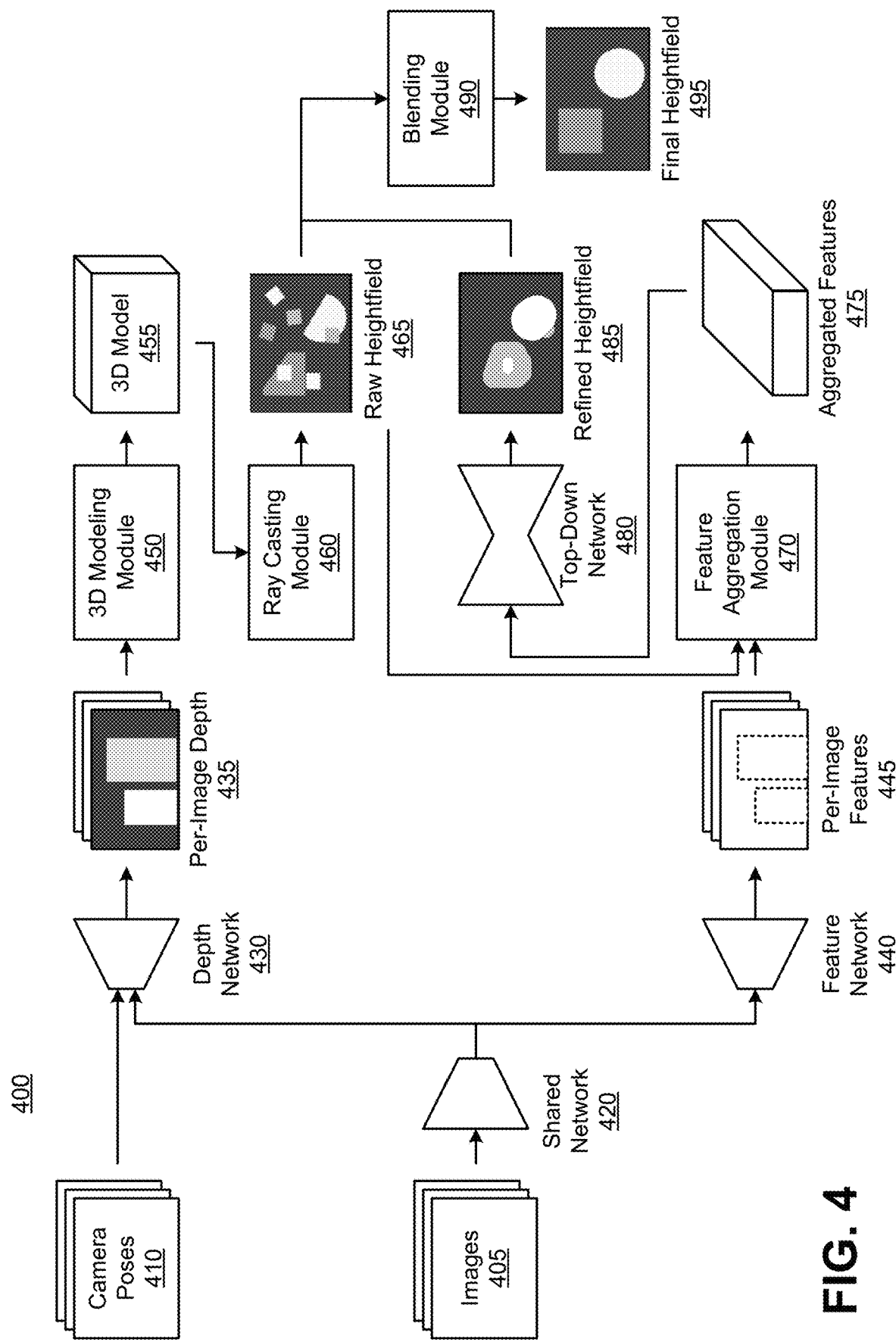
FIG. 4 illustrates an example architecture of a scene reconstruction model 400, according to one or more embodiments.

Those of ordinary skill in the art, using the disclosures provided herein, will appreciate that numerous game interface configurations and underlying functionalities will be apparent in light of this disclosure. The present disclosure is not intended to be limited to any one particular configuration.

Scene Reconstruction Model Architecture FIG. 4 illustrates an example architecture of a scene reconstruction model 400, according to one or more embodiments. In the embodiment shown in FIG. 4, the scene reconstruction model 400 comprises the following components: a depth network 430, a feature network 440, a 3D modeling module 450, a ray casting module 460, a feature aggregation module 470, a top-down network 480, and a blending module 490. In other embodiments, the scene reconstruction model 400 may comprise additional, fewer, or different components than those listed herein.

The scene reconstruction model 400 may be a machine-learning model trained by the training system 170 using a training set of images 405 with camera poses 410. To supervise the training, the scene reconstruction model 400 may utilize one or more types of ground truth information. For example, the training set of images may accompany a ground truth 3D representation of the environment. The training system 170 may calculate an overall loss between the ground truth 3D representation and a final heightfield 495 generated by the scene reconstruction model 400. In other examples, the training system 170 may utilize other ground truth data for calculating a loss for one or more of the components. Once trained, the scene reconstruction model 400 is configured to input a test set of images 405 and camera poses 410 to generate a final heightfield 495 of the environment captured in the test set of images 405.

The inputs generally comprise images 405 and camera poses 410 for the images 405. In some embodiments, the camera poses 410 may be estimated based on the images 405. A pose estimation model may be implemented to estimate the relative poses of each image. In other embodiments, the camera poses 410 may be determined based on information captured by a position sensor (e.g., an inertial measurement unit, an accelerometer, a gyroscope, a GPS device, etc.).

The shared network 420 encodes the images 405. The shared network 420 may encode the images 405 through one or more dimensionality reduction algorithms. For example, the shared network 420 may utilize convolutional layers to reduce dimensionality of the images 405. In other examples, the shared network 420 may extract one or more deep features of the images 405. Deep features may include, but is not limited to, abstract features, objects of interest, corners, edges, outlines of objects, horizon, semantic segmentation, other characteristics of the input image, or some combination thereof. In some embodiments, the shared network 420 is omitted from the scene reconstruction model 400. In such embodiments, the images 405 and the camera poses 410 are fed into the depth network to predict the per-image depth 435, and the images 405 are fed into the feature network to extract per-image features 445.

The depth network 430 estimates a per-image depth 435. The depth network 430 may input both deep features from the shared network 420 and camera poses 410. The depth network 430 may be trained as a monocular depth estimation model. A monocular depth estimation model inputs an image and outputs a depth map.

In one or more embodiments, the monocular depth estimation model may be trained in a supervised fashion with ground truth depth for a training set of images. Ground truth depth may be captured via a detection and ranging sensor (e.g., a light detection and ranging sensor (LIDAR)). The training system 170 may input the images into the depth network 430 (and may further pass through the shared network 420) to output depth predictions. The training system 170 may calculate a loss between the depth prediction and the ground truth depth. Training of the depth estimation model encompasses adjusting of parameters of the depth estimation model to minimize the loss.

In some embodiments, the monocular depth estimation model may be trained in an unsupervised fashion without ground truth depth, rather using stereoscopic images. The stereoscopic images may have a known or a predicted camera pose between the stereoscopic images. The training system 170 predicts depth for a first image in a stereoscopic image pair and projects the first image onto the second image to generate a synthetic image, the projection being based on the depth and the camera poses. The training system 170 calculates a loss between the synthetic image and the second image. Training of the depth estimation model includes adjusting parameters of the depth estimation model to minimize the loss across a training set of stereoscopic image pairs. In some embodiments, the stereoscopic image pairs may be true stereoscopic image pairs captured by two or more cameras at known relative poses. In other embodiments, the stereoscopic image pairs may be pseudo stereoscopic image pairs captured by camera at different poses in proximal timestamps.

The feature network 440 extracts per-image features 445. Each image has a set of features 445 that are extracted from the image. The feature network 440 may employ one or more layers to extract the features. For example, an edge detection layer may extract edges of objects in the images 405. Other features include abstract features, objects of interest, corners, edges, outlines of objects, horizon, semantic segmentation, other characteristics of the input image, or some combination thereof. The feature network 440 may be separately trained from other components of the scene reconstruction model 400. For example, an edge detection layer may be separately trained and fixed during training of other components in the scene reconstruction model 400.

The 3D modeling module 450 inputs the per-image depth 435 to generate a raw 3D model 455 of the environment. The 3D model 455 may be a voxel array in three-dimensional space. The voxel array identifies each voxel as occupied or unoccupied. The 3D modeling module 450 may generate the 3D model with a truncated signed distance field (TSDF). A TSDF is a 3D voxel array representing objects within a volume of space in which each voxel is labeled with the distance to the nearest surface. Multiple input images 405 may aid in smoothing out the 3D model 455. Voxel hashing may be utilized to decrease memory size of the 3D model 455 to speed up computations. The raw heightfield 465 is generally sharp around regions captured by multiple images, but incomplete in regions with little signal from the images 405.

The ray casting module 460 generates a raw heightfield 465 based on the 3D model 455. The ray casting module 460 casts, for each position of the raw heightfield, a ray downward to a surface of the 3D model 455 to determine a height of a surface at that position. The ray casting module 460 assigns each cell in the 2D space a height based on ray casting of the 3D model 455. The raw heightfield 465 may be converted into a point cloud, representing each cell as a 3D point.

The feature aggregation module 470 aggregates features 475 from the per-image features 445 based in part on the raw heightfield 465. The feature aggregation module 470, for each set of per-image features 445, transposes the raw heightfield 465 or the point cloud to the perspective of the camera pose for the image. The feature aggregation module 470 identifies whether a cell is visible or hidden from the camera perspective. For the visible cells, the feature aggregation module 470 may extract features corresponding to the position of the visible cells. The feature aggregation module 470 may then, at each cell, average out features extracted from each set of per-image features 445, thereby resulting in the aggregated features 475. This depth-based sampling quickens computations as the scene reconstruction model 400 need not project per-image features 445 to all voxels along a ray for a given pixel in the image. As such, the depth-based sampling quickly maps features to cells or positions in the point cloud. The aggregated features 475 may collate each type of feature into a separate tensor. For example, a first feature type is aggregated into a first 2D tensor, and a second feature type is aggregated into a second 2D tensor, and so on with any additional feature types.

The top-down network 480 inputs the aggregated features 475 to regress the refined heightfield 485. The top-down network may be a machine-learning model (e.g., a convolutional neural network (CNN)). The output is a refined heightfield 485. The refined heightfield 485 may be, in comparison to the raw heightfield 465, more complete but with less sharpness to the geometry. The top-down network 480 may further output a blend map that predicts where the refined heightfield 485 is closer to ground truth than the raw heightfield 465. The training system 170 may train the top-down network 480 using ground truth heightfield, e.g., determined through more robust 3D modeling utilizing ground truth depth.

The blending module 490 blends the raw heightfield 465 and the refined heightfield 485 into the final heightfield 495. The blending module 490 utilizes the blend map to determine contribution of the raw heightfield 465 and contribution of the refined heightfield 485 on a per-cell basis.

When training the scene reconstruction model 400, the training system 170 may utilize ground truth heightfields. For some ground truth heightfields, the ground truth is sparse. As such, the training system 170 may utilize a mask that constrains the loss to comparable regions.

Exemplary Methods

Figure 5:
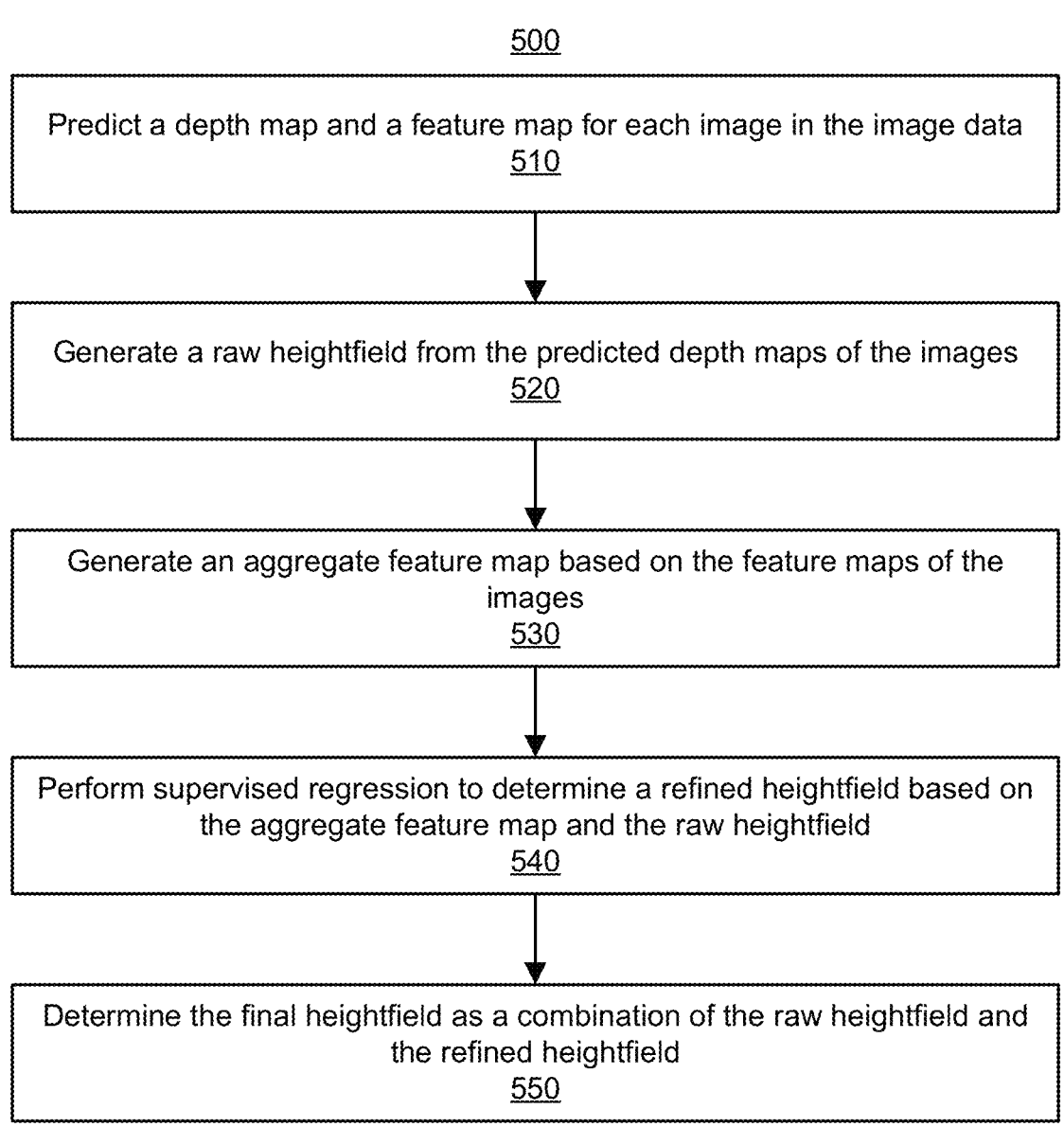
FIG. 5 is a flowchart describing a method of generating a heightfield using a scene reconstruction model, in accordance with one or more embodiments.

FIG. 5 is a flowchart describing a method 500 of generating a heightfield using a scene reconstruction model, in accordance with one or more embodiments. At training time, the method 500 will typically be repeated numerous times with different sets of training image data until one or more training targets are met. A training system (e.g., the training system 170) may perform the training utilizing a loss function to assess predictive power of the scene reconstruction model. During inference or deployment, a client device (e.g., the client device 110) may perform the method 500 to generate a heightfield for image data captured by a camera assembly (e.g. the camera assembly 125). The steps of FIG. 5 are illustrated from the perspective of a general computing device performing the method 500. However, some or all of the steps may be performed by other entities and/or components. In addition, some embodiments may perform the steps in parallel, perform the steps in different orders, or perform different steps.

The general computing device predicts 510 a depth map and a feature map for each image in the image data. The scene reconstruction model may comprise a depth network for predicting the depth map from an image and a feature network for extracting the feature map from the image. In one or more embodiments, the scene reconstruction model further comprises an additional shared network implemented upstream of the depth network and the feature network. In such embodiments, the general computing device inputs the image data into the shared network to encode the image data.

The general computing device generates a raw heightfield by ray casting the predicted depth maps of the images. The general computing device may build a 3D voxel array based on the predicted depth maps. The 3D voxel array may be represented as a TSDF volume. The TSDF volume is generated by the general computing device by determining whether voxels are occupied by a volumetric object based on the predicted depth maps and the camera poses of the images. The general computing device generates the raw heightfield by ray casting from top-down perspective above the environment.

The general computing device generates an aggregate feature map based on the feature maps of the images. The general computing device may utilize the TSDF volume as a starting point. The general computing device may sample features from the feature maps according to the raw heightfield. For example, the general computing device identifies visible and occluded cells from an image's camera pose. From the visible cells, the general computing device samples features from the feature maps. The general computing device may aggregate the sampled features from the images to generate the aggregate feature map. One embodiment of aggregation includes averaging features across the feature maps at a particular position. The feature map may comprise a tensor per feature type, e.g., a first tensor for a first feature type, a second tensor for a second feature type, and so on for any additional feature type.

The general computing device performs supervised regression to determine a refined heightfield based on the aggregate feature map. The regression layer may input the aggregate feature map and output a refined heightfield. The regression layer may implement a deep learning neural network. The top-down network may further output a blend map that predicts which cells a refined heightfield may be closer to the ground truth heightfield compared to the raw heightfield. In other words, the blend map represents the confidence that the top-down network has in its refined heightfield's representation of the geometry of the scene.

The general computing device determines the final heightfield as a combination of the raw heightfield and the refined heightfield. In one or more embodiments, the general computing device blends the raw heightfield and the refined heightfield according to the blend map.

When training the scene reconstruction model, the training system may utilize ground truth heightfields to assess a loss between the final heightfield output by the scene reconstruction model and the ground truth heightfield. The training system may train the scene reconstruction model by adjusting parameters to minimize the loss. In one example, the overall loss may incorporate a gradient matching loss.

When training the scene reconstruction model, the training system may synchronously train one or more components of the scene reconstruction model. For example, the training system may train the top-down network and the blending module synchronously using the ground truth heightfield.

In other embodiments, the training system may asynchronously train one or more of the components. For example, the training system may separately train the depth network. Once trained, the training system may fix the depth network, i.e., hold parameters to be non-adjustable, while training other components. As another example, the training system may separately train the feature network.

Figure 6:
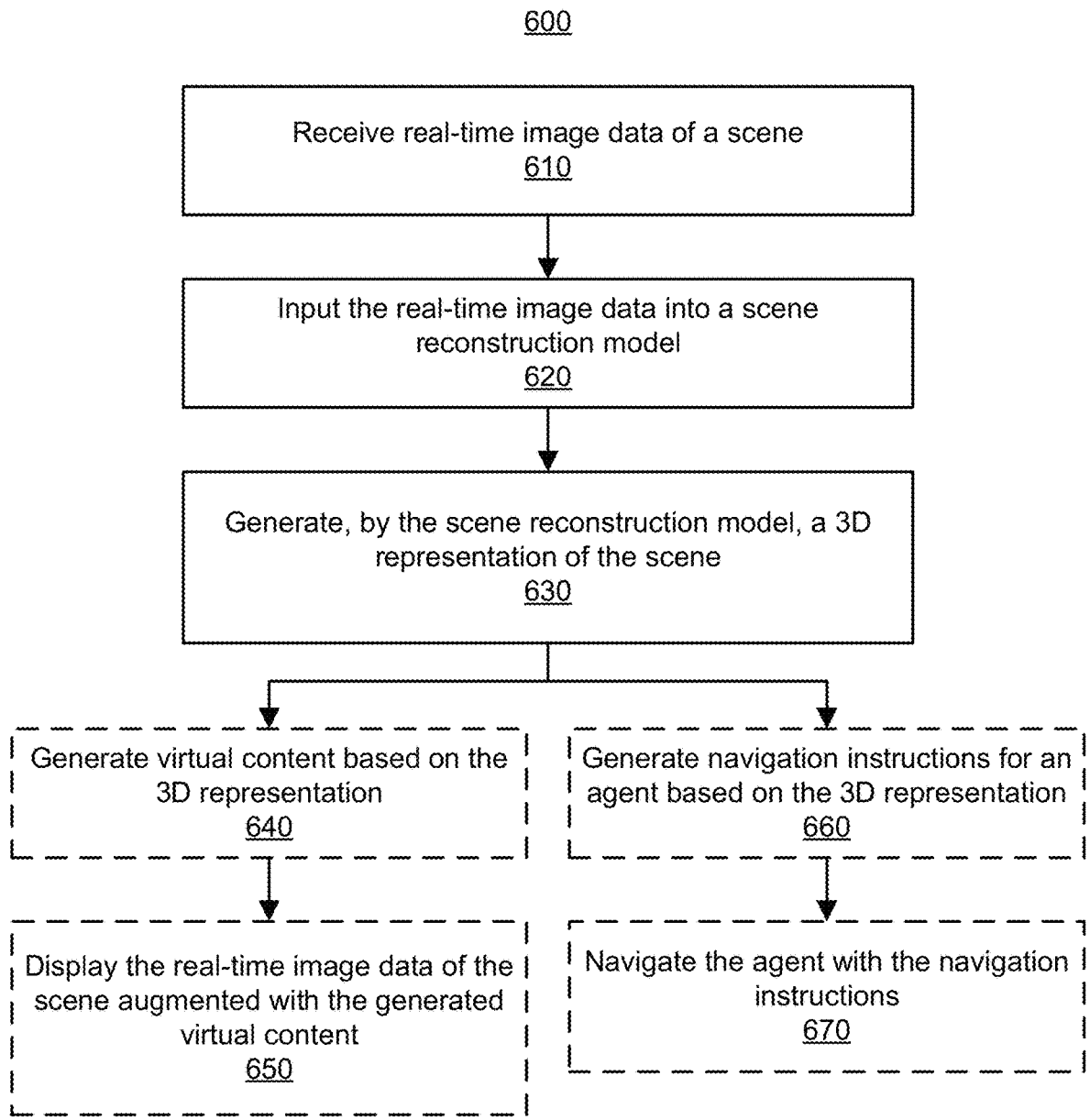
FIG. 6 is a flowchart describing a method of applying a heightfield generated by a scene reconstruction model, according to one or more embodiments.

FIG. 6 is a flowchart describing a method 600 of applying a heightfield generated by a scene reconstruction model, in accordance with one or more embodiments. The steps of FIG. 6 are illustrated from the perspective of a client device performing the method 600. However, some or all of the steps may be performed by other entities and/or components. In addition, some embodiments may perform the steps in parallel, perform the steps in different orders, or perform different steps.

The client device receives 610 real-time image data of a scene. The image of the scene may be captured by a camera that is a component of the client device or external to the client device. In the context of the parallel reality game, the scene may be of real-world locations that may map to virtual locations in the virtual world. The image of the scene may also have intrinsics corresponding to the geometric properties of the camera that captured the image. The image may be a single image captured by the camera. Alternatively, the image may be a frame from video being captured by the camera.

The client device inputs 620 the real-time image data of the scene into a trained scene reconstruction model. The scene reconstruction model may be trained by the training system, e.g., as described in conjunction with FIG. 5. The scene reconstruction model receives the image data of the scene.

The scene reconstruction model generates 630 a 3D model (e.g., including a heightfield). As described previously, the 3D model depicts spatial positioning of objects in the scene. In one or more embodiments, the 3D model includes a heightfield, wherein each 2D position has a height value of an object located at that 2D position.

The client device may perform various additional operations with the 3D representation and/or the heightfield.

In one embodiment, the client device generates 640 virtual content for an augmented reality experience, e.g., in a parallel reality game. The virtual content may be generated such that the virtual content interacts with the surfaces of the physical objects as represented in the 3D representation of the scene. As an example, a virtual character may be shown jumping on top of physical objects as informed by the 3D representation and/or the heightfield.

The client device displays 650 the image of the scene augmented with the virtual content. A display of the client device can provide a constant feed of video captured by the camera with augmented virtual content. For example, a physical object may be augmented with virtual content that interacts with the physical object.

In another embodiment, the client device generates 660 navigation instructions an autonomous agent based on the 3D representation and/or the heightfield. The navigation instructions may inform navigation of the agent around the topography of the environment, e.g., as represented in the 3D representation and/or the heightfield. For example, an autonomous vehicle can travel around physical objects that stand above the ground floor that the autonomous vehicle is resting on. In other examples, an autonomous vehicle is capable of ascending or descending varied heights. The navigation instructions may instruct the autonomous vehicle to approach a height disparity to ascend or descend.

The client device navigates 670 the autonomous agent with the navigation instructions. The navigation instructions may control one or more motors or actuators on the autonomous agent to navigate the agent around the environment.

In additional embodiments (not shown in FIG. 6), the client device may utilize the 3D representation and/or the heightfield for other applications. In one embodiment, the client device may determine one or more visual occlusions in the images utilizing the heightfield. Visual occlusions are regions occluded by physical objects captured in the image data. For example, an image of a box sitting on the ground occludes objects and/or surfaces sitting behind the box, from the perspective of the camera. The client device can utilize the 3D representation and/or the heightfield to inform visual occlusions in the image data. Based on the visual occlusions, the client device may generate virtual content that may be partially occluded when placed behind a physical object captured in the image data. In another embodiment, the client device may utilize the 3D representation and/or the heightfield to generate a floor map estimating the floor space in the environment. The floor map may inform placement of virtual elements (e.g., from the augmented reality game). In yet another embodiment, the client device may utilize the heightfield to build a 3D model of the environment.

Example Computing System

Figure 7:
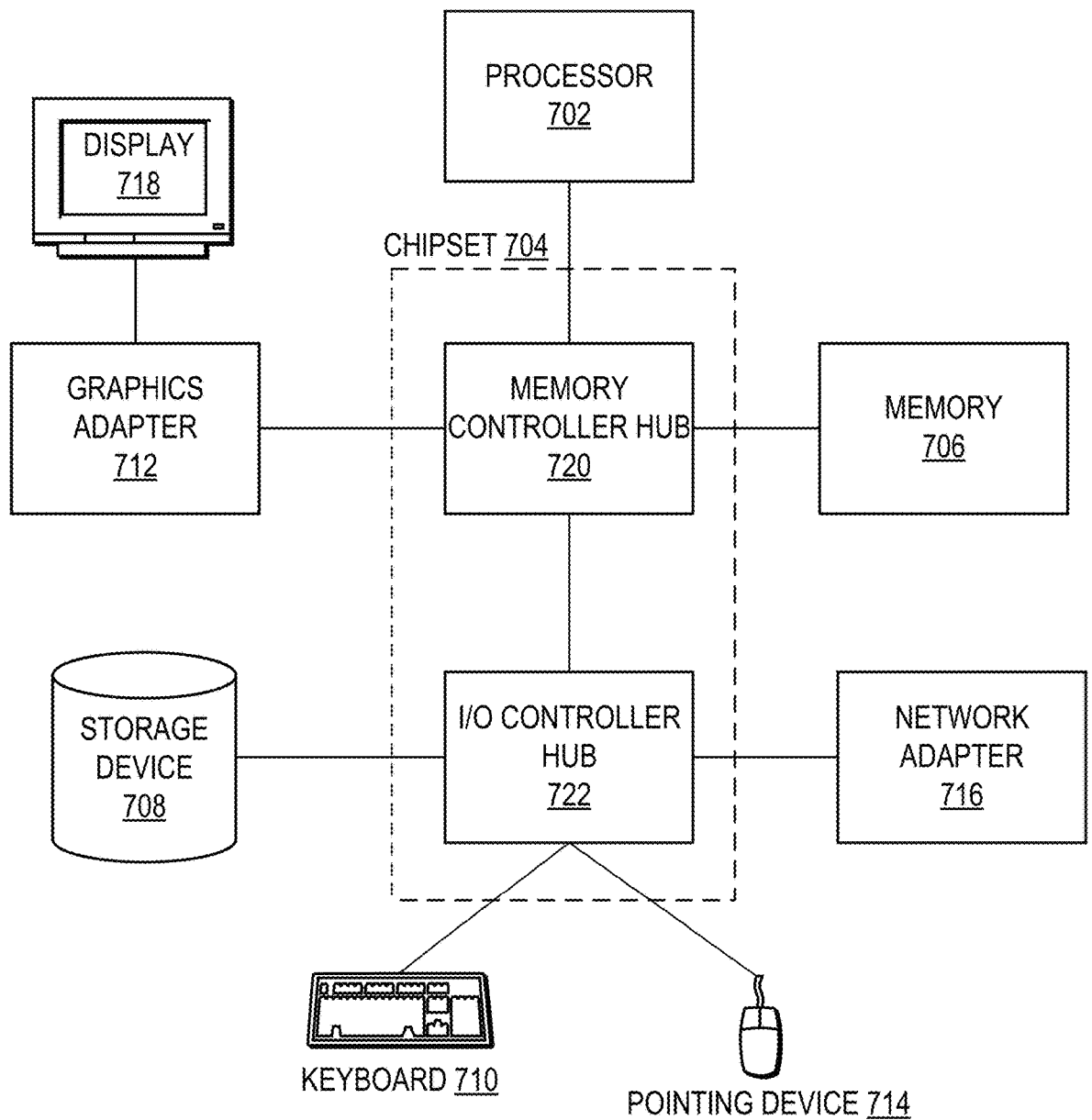
FIG. 7 illustrates an example computer system suitable for use in training or applying a depth estimation model, according to one or more embodiments.

FIG. 7 is an example architecture of a computing device, according to an embodiment. Although FIG. 7 depicts a high-level block diagram illustrating physical components of a computer used as part or all of one or more entities described herein, in accordance with an embodiment, a computer may have additional, less, or variations of the components provided in FIG. 7. Although FIG. 7 depicts a computer 700, the figure is intended as functional description of the various features which may be present in computer systems than as a structural schematic of the implementations described herein. In practice, and as recognized by those of ordinary skill in the art, items shown separately could be combined and some items could be separated.

Illustrated in FIG. 7 are at least one processor 702 coupled to a chipset 704. Also coupled to the chipset 704 are a memory 706, a storage device 708, a keyboard 710, a graphics adapter 712, a pointing device 714, and a network adapter 716. A display 718 is coupled to the graphics adapter 712. In one embodiment, the functionality of the chipset 704 is provided by a memory controller hub 720 and an I/O hub 722. In another embodiment, the memory 706 is coupled directly to the processor 702 instead of the chipset 704. In some embodiments, the computer 700 includes one or more communication buses for interconnecting these components. The one or more communication buses optionally include circuitry (sometimes called a chipset) that interconnects and controls communications between system components.

The storage device 708 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 708 can also be referred to as persistent memory. The pointing device 714 may be a mouse, track ball, or other type of pointing device, and is used in combination with the keyboard 710 to input data into the computer 700. The graphics adapter 712 displays images and other information on the display 718. The network adapter 716 couples the computer 700 to a local or wide area network.

The memory 706 holds instructions and data used by the processor 702. The memory 706 can be non-persistent memory, examples of which include high-speed random-access memory, such as DRAM, SRAM, DDR RAM, ROM, EEPROM, flash memory.

As is known in the art, a computer 700 can have different and/or other components than those shown in FIG. 7. In addition, the computer 700 can lack certain illustrated components. In one embodiment, a computer 700 acting as a server may lack a keyboard 710, pointing device 714, graphics adapter 712, and/or display 718. Moreover, the storage device 708 can be local and/or remote from the computer 700 (such as embodied within a storage area network (SAN)).

As is known in the art, the computer 700 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 708, loaded into the memory 706, and executed by the processor 702.

ADDITIONAL CONSIDERATIONS

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for verifying an account with an on-line service provider corresponds to a genuine business. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

What is claimed is:

1. A computer-implemented method comprising:
   receiving real-time image data of a scene captured by a camera assembly of a mobile device;
   inputting the real-time image data of the scene into a scene reconstruction model;
   receiving, from the scene reconstruction model, a final heightfield of the scene comprising a height value at each 2D position of the scene, wherein the scene reconstruction model generates the final heightfield by:
     for each image of the image data, predicting a depth map based on the image,
     for each image of the image data, extracting a feature map based on the image,
     generating a raw heightfield based on the predicted depth maps of the images,
     generating an aggregate feature map based on the feature maps of the images,
     regressing a refined heightfield based on the aggregate feature map, and
     determining the final heightfield as a combination of the raw heightfield and the refined heightfield; and
   providing functionality on the mobile device related to the scene and based on the final heightfield.

2. The computer-implemented method of claim 1, wherein the real-time image data comprises a plurality of images and a camera pose for each image.

3. The computer-implemented method of claim 2, wherein the camera pose for each image is captured by a position sensor of the mobile device.

4. The computer-implemented method of claim 2, wherein the camera pose for each image is estimated by a pose estimation model based on the images.

5. The computer-implemented method of claim 1, wherein predicting the depth map comprises applying a depth estimation model to the image to determine the depth map.

6. The computer-implemented method of claim 1, wherein extracting the feature map comprises applying a convolutional network to the image to determine the feature map.

7. The computer-implemented method of claim 1, wherein the feature map comprises a first tensor for a first feature type and a second tensor for a second feature type.

8. The computer-implemented method of claim 1, wherein generating the raw heightfield comprises:
   generating a 3D model using truncated signed distance field with the predicted depth maps; and
   ray casting the 3D model to generate the raw heightfield.

9. The computer-implemented method of claim 8, wherein ray casting the 3D model to generate the raw heightfield comprises, for each position of the raw heightfield, casting a ray downward to a surface of the 3D model to determine a height of the surface at that position.

10. The computer-implemented method of claim 1, wherein generating the aggregate feature map comprises:
for each image of the image data:
transposing the raw heightfield to a perspective of a camera pose for the image,
identifying whether each position of the raw heightfield is visible or hidden at the perspective of the camera pose, and
sampling features from the visible positions; and
for each position of the aggregate feature map, averaging one or more features of the image data at that position.

11. The computer-implemented method of claim 1, wherein regressing the refined heightfield comprises applying a machine-learning model to the aggregate feature map.

12. The computer-implemented method of claim 11, wherein the scene reconstruction model generates the final heightfield by further outputting a blend map that predicts at each position a confidence of the refined heightfield at that position.

13. The computer-implemented method of claim 12, wherein determining the final heightfield as a combination of the raw heightfield and the refined heightfield comprises, at each position of the final heightfield, a contribution of the refined heightfield at that position is based on the confidence for that position in the blend map.

14. The computer-implemented method of claim 1, wherein providing functionality on the mobile device comprises generating, using the final heightfield, virtual content for display in conjunction with the real-time image data of the scene.

15. The computer-implemented method of claim 14, wherein generating the virtual content comprises generating a virtual object that rests on a surface in the final heightfield or can move between two or more surfaces in the final heightfield.

16. The computer-implemented method of claim 1, wherein the mobile device is a component of an autonomous vehicle, wherein providing functionality on the mobile device comprises:
generating navigation instructions for the autonomous vehicle based on a current position of the autonomous vehicle and the final heightfield; and
navigating the autonomous vehicle according to the navigation instructions.

17. A computer-implemented method comprising:
receiving one or more sets of training image data of one or more scenes captured by one or more camera assemblies with one or more ground truth heightfields for the one or more scenes;
inputting each set of training image data of the scene into a scene reconstruction model;
receiving, from the scene reconstruction model, a final heightfield of the scene comprising a height value at each 2D position of the scene, wherein the scene reconstruction model generates the final heightfield by:
for each image of the set of training image data, predicting a depth map based on the image,
for each image of the set of training image data, extracting a feature map based on the image,
generating a raw heightfield based on the predicted depth maps of the images,
generating an aggregate feature map based on the feature maps of the images,
regressing a refined heightfield based on the aggregate feature map, and
determining the final heightfield as a combination of the raw heightfield and the refined heightfield;
determining for each set of training data a loss between the final heightfield for the scene and the ground truth heightfield for the scene; and
training the scene reconstruction model to minimize the loss.

18. The computer-implemented method of claim 17, wherein the training image data comprises a plurality of images and a camera pose for each image.

19. The computer-implemented method of claim 18, wherein the camera pose for each image is either captured by a position sensor or estimated by a pose estimation model based on the images.

20. The computer-implemented method of claim 17, wherein predicting the depth map comprises applying a depth estimation model to the image to determine the depth map.

21. The computer-implemented method of claim 17, wherein extracting the feature map comprises applying a convolutional network to the image to determine the feature map.

22. The computer-implemented method of claim 17, wherein the feature map comprises a first tensor for a first feature type and a second tensor for a second feature type.

23. The computer-implemented method of claim 17, wherein generating the raw heightfield comprises:
generating a 3D model using truncated signed distance field with the predicted depth maps; and
ray casting the 3D model to generate the raw heightfield.

24. The computer-implemented method of claim 23, wherein ray casting the 3D model to generate the raw heightfield comprises, for each position of the raw heightfield, casting a ray downward to a surface of the 3D model to determine a height of the surface at that position.

25. The computer-implemented method of claim 17, wherein generating the aggregate feature map comprises:
for each image of the image data:
transposing the raw heightfield to a perspective of a camera pose for the image,
identifying whether each position of the raw heightfield is visible or hidden at the perspective of the camera pose, and
sampling features from the visible positions; and
for each position of the aggregate feature map, averaging one or more features of the image data at that position.

26. The computer-implemented method of claim 17, wherein regressing the refined heightfield comprises applying a machine-learning model to the aggregate feature map.

27. The computer-implemented method of claim 26, wherein the scene reconstruction model generates the final heightfield by further outputting a blend map that predicts at each position a confidence of the refined heightfield at that position.

28. The computer-implemented method of claim 27, wherein determining the final heightfield as a combination of the raw heightfield and the refined heightfield comprises, at each position of the final heightfield, a contribution of the refined heightfield at that position is based on the confidence for that position in the blend map.

29. The computer-implemented method of claim 17, wherein training the scene reconstruction model comprises synchronously training one or more components of the scene reconstruction model.

30. The computer-implemented method of claim 17, wherein training the scene reconstruction model comprises asynchronously training one or more components of the scene reconstruction model.

31. A computer-program product comprising a non-transitory computer-readable storage medium storing a scene reconstruction model, wherein the computer-program product is manufactured by a process comprising:
- receiving one or more sets of training image data of one or more scenes captured by one or more camera assemblies with one or more ground truth heightfields for the one or more scenes;
- inputting each set of training image data of the scene into the scene reconstruction model;
- receiving, from the scene reconstruction model, a final heightfield of the scene comprising a height value at each 2D position of the scene, wherein the scene reconstruction model generates the final heightfield by:
  - for each image of the set of training image data, predicting a depth map based on the image,
  - for each image of the set of training image data, extracting a feature map based on the image,
  - generating a raw heightfield based on the predicted depth maps of the images,
  - generating an aggregate feature map based on the feature maps of the images,
  - regressing a refined heightfield based on the aggregate feature map, and
  - determining the final heightfield as a combination of the raw heightfield and the refined heightfield;
- determining for each set of training data a loss between the final heightfield for the scene and the ground truth heightfield for the scene;
- training the scene reconstruction model to minimize the loss; and
- storing the scene reconstruction model on the non-transitory computer-readable storage medium.

* * * * *